(12) United States Patent
O'Doherty (10) Patent No.: US 7,743,149 B1
(45) Date of Patent: *Jun. 22, 2010

(54) SIP MESSAGES CARRYING EXECUTABLE COMPUTER SOFTWARE CODE

(75) Inventor: Michael O'Doherty, London (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/520,853

(22) Filed: Mar. 7, 2000

Related U.S. Application Data (60) Provisional application No. 60/171,777, filed on Dec. 22, 1999, provisional application No. 60/171,801, filed on Dec. 22, 1999.

(51) Int. Cl.
*G06F 15/16* (2006.01)

(52) U.S. Cl. .................. 709/227; 709/228; 709/200; 709/239; 709/230; 719/310; 719/328; 719/332; 719/313; 455/507; 455/520; 455/416; 370/389; 370/310; 370/260; 370/353

(58) Field of Classification Search .................. 709/203, 709/204, 207, 223–229, 220, 208, 200; 707/10; 370/261
See application file for complete search history.

(56) References Cited

U.S. PATENT DOCUMENTS

| | | | | |
|---|---|---|---|---|
| 5,423,042 A * | 6/1995 | Jalili et al. | .................. | 395/700 |
| 6,003,082 A * | 12/1999 | Gampper et al. | ............ | 709/225 |
| 6,014,688 A * | 1/2000 | Venkatraman et al. | ...... | 709/206 |
| 6,125,366 A * | 9/2000 | Bernstein et al. | ............ | 707/103 |
| 6,175,868 B1 * | 1/2001 | Lavian et al. | ................ | 709/223 |
| 6,282,193 B1 * | 8/2001 | Hluchyj et al. | ............... | 370/356 |
| 6,393,497 B1 * | 5/2002 | Arnold et al. | ............... | 709/330 |
| 6,421,674 B1 * | 7/2002 | Yoakum et al. | ............... | 707/10 |
| 6,434,143 B1 * | 8/2002 | Donovan | ..................... | 370/356 |
| 6,438,555 B1 * | 8/2002 | Orton | ......................... | 707/100 |
| 6,446,070 B1 * | 9/2002 | Arnold et al. | ................. | 707/10 |
| 6,446,111 B1 * | 9/2002 | Lowery | ...................... | 709/203 |
| 6,487,607 B1 * | 11/2002 | Wollrath et al. | ............. | 709/330 |
| 6,567,399 B1 * | 5/2003 | Schuster et al. | ............. | 370/352 |

(Continued)

OTHER PUBLICATIONS

Handley et al., "SIP: Session Initiation Protocol", Mar. 1999, IETF, RFC-2543, pp. 9-11, 24-26, and 84-860.*

(Continued)

*Primary Examiner*—Jude J Jean Gilles
(74) *Attorney, Agent, or Firm*—Barnes & Thornburg LLP (57) ABSTRACT

Modifications to SIP (Session Initiation Protocol) are made which significantly extend the functionality of SIP. SIP messages are associated with computer software code such as Java byte code, Java applets or mobile autonomous software agents. SIP clients are arranged such that on receipt of a SIP message that has been associated with computer software code, that code is executed by a processor associated with the SIP client. In the case that Java applets are contained in a SIP message these are executed by a Java Virtual Machine associated with the SIP client. If a Java mobile agent is contained in the SIP message this executes on a Java Mobile Agent Virtual Machine associated with the SIP client. Preferably an indicator is put into the header of a SIP message to indicate that it has been associated with computer software code, and SIP clients are arranged to detect the presence of such indicators.

31 Claims, 6 Drawing Sheets

U.S. PATENT DOCUMENTS

| | | | |
|---|---|---|---|
| 6,636,965 B1 * | 10/2003 | Beyda et al. | 713/152 |
| 6,816,579 B2 * | 11/2004 | Donovan et al. | 379/88.17 |
| 7,010,727 B1 * | 3/2006 | Stucker | 714/52 |
| 7,050,661 B2 * | 5/2006 | Lyons | 385/12 |
| 7,050,861 B1 * | 5/2006 | Lauzon et al. | 700/17 |

OTHER PUBLICATIONS

Byttner et al., "The SIP Servlet API", Sep. 1999, IETF, p. 3.*

"ChaiTime: a system for rapid creation of portable next-generation telephony services using third-party software components" by Caruso et al., Mar. 26-27, 1999 pp. 22-31.*

"ChaiTime: a system for rapid creation of portable next-generation telephony services using third-party software components" by Caruso et al., Mar. 26-27, 1999 pp. 22-31.*

Bill Venners, "Under the Hood: The architecture of aglets", JavaWorld Apr. 1997.

XP002160272—A. Kristensen, A. Bryttner: "The SIP Servlet API" Internet Draft Sep. 1999, pp. 1-26. Retrieved from the Internet: <URL: http://cph.telstra.net/ietf/old-ids/draft-kristiensen-sip-servlet-00.txt>.

XP002160273—Kaukonen S.; Sauvola J.; Ojala T.: "Agent based conferencing using mobile IP-telephony" IEEE 3rd Workshop on Multimedia Signal Processing, Sep. 13-15, 1999, pp. 593-598.

XP002160274—Rosenberg J; Lennox J; Schulzrinne H.: "Programming Internet telephony services" IEEE Network, vol. 13, No. 3, May 1999-Jun. 1999, pp. 42-49.

XP002160275—Kiniry J.; Zimmermann D.: "A hands-on look at Java mobile agents" IEEE Internet Computing, vol. 1, No. 4, Jul. 1997-Aug. 1997, pp. 21-30.

"A Beginner's Guide to URLSs", http://archive.ncsa.uiu.edu/.

* cited by examiner

```
Request  =  Request-Line
               *( general-header
                | request-header
                | entity-header )
               CRLF
               [ message-body ]
```
} 40

```
general-header  =  Accept
                 | Accept-Encoding
                 | Accept-Language
                 | Call-ID
                 | Contact
                 | CSeq
                 | Date
                 | Encryption
                 | Expires
                 | From
                 | Record-Route
                 | Timestamp
                 | To
                 | Via
```
} 41

42 { 
```
entity-header  =  Content-Encoding
                | Content-Length
                | Content-Type       ; <---- This will indicate that the
                                              content type is a java applet
```
43 {
```
request-header =  Authorization                  or a Java Mobile Agent (or the
                | Contact                        URL of a location of either
                | Hide                            from where they must be
                | Max-Forwards                    retrieved)
                | Organization
                | Priority
                | Proxy-Authorization
                | Proxy-Require
                | Route
                | Require            ; <----- This will be used to indicate
                | Response-Key                 that Java-enhanced-SIP must
                | Subject                      be supported to process this
                | User-Agent                    message.
```

```
response-header =  Allow
                 | Proxy-Authenticate
                 | Retry-After
                 | Server
                 | Unsupported
                 | Warning
                 | WWW-Authenticate
```
} 44

FIGURE 4

C ->S: INVITE sip:watson@boston.bell-tel.com SIP/2.0
Via: SIP/2.0/UDP kton.bell-tel.com>
From: A. Bell ,sip:a.g.bell@bell-tel.com>
To: T. Watson ,sip:watson@bell-tel.com.
Call-ID: 3298420296@kton.bell.tel.com
Cseq: 1 INVITE
Subject: Mr. Watson, come here.
Content-Type: multipart/mixed; boundary=3E4A567F4C8A
(or URL for java applet)
Content-Length: ...
Require: org.ietf.sip.java-enhanced-sip (Within the message body)

```
--3E4A567F4C8A
      Content-Type: application/x-sipjava
      Content-Encoding: binary
      Content-length: xxx
      ...Java applet or Java mobile agent for SIP message
      processing...
--3E4A567F4C8A—
```

SIP MESSAGES CARRYING EXECUTABLE COMPUTER SOFTWARE CODE

RELATED APPLICATION

This application is the non-provisional filing of provisional applications Nos. 60/171,777, filed Dec. 22, 1999 and 60/171,801, filed Dec. 22, 1999.

BACKGROUND OF THE INVENTION

1. Field of the Invention

This invention relates to a method communicating between a first and a second node in a communications network, each of the nodes comprising a SIP client. The invention also relates to a communications network node comprising a SIP client arranged to implementing the method, a computer program for controlling the communications network node and a communications network incorporating such a node. The invention also relates to a method of setting up a conference call between more than two parties using the method of communication.

2. Description of the Prior Art

Session initiation protocol (SIP) is used to set up communications sessions such as data or voice communication sessions between two SIP clients. SIP is a simple signalling protocol for Internet conferencing and telephony and details about SIP are available on the Internet at www.cs.columbia.edu\~hgs\sip\ and also in the document "Request for comments (RFC) 2543 SIP: Session Initiation Protocol" Handley, et al. March 1999 available from the internet site listed above. As well as being used to set up communications sessions, SIP is also used to modify and terminate sessions with one or more participants. For example, these sessions may be Internet multimedia conferences, internet telephone calls and multimedia distribution. Communication between members of a session is via multicast or a mesh of unicast relations, or a combination of these. Using SIP, session descriptions that allow participants to agree on a set of compatible media types may be used. Also, user mobility is supported by proxying and redirecting requests to a user's current location. As well as this SIP is not tied to any particular conference control protocol. However, the standard SIP protocol only supports a limited set of functionality and this is a significant drawback.

Multimedia teleconferencing and other conference calls are a complicated service for an end user to use. Because of this complexity many conferences experience problems or interrupts as various users set up the calls incorrectly. Central manual operators are often required to set-up the calls and this is expensive.

It is accordingly an object of the present invention to provide a method of communicating between a first and a second node in a communications network where those nodes each comprise a SIP client, which overcomes or at least mitigates one or more of the problems noted above.

SUMMARY OF THE INVENTION

Modifications to SIP are made which significantly extend the functionality of SIP for example by allowing a service for automatically setting up multi-media conferences to be easily provided. SIP messages are associated with computer software code such as Java byte code, Java applets or mobile autonomous software agents. An example of a mobile autonomous agent is a Java mobile agent. This computer software code may be contained in the body of a SIP message or an address indicating where the computer software code is located is stored in the SIP message. SIP clients are arranged such that on receipt of a SIP message that has been associated with computer software code, that code is executed by a processor associated with the SIP client. For example, in the case that Java applets are contained in a SIP message these are executed by a Java Virtual Machine associated with the SIP client. If a Java mobile agent is contained in the SIP message this executes on a Java Mobile Agent Virtual Machine associated with the SIP client. In one example, such computer software code must always be executed by the processor associated with the SIP client before that SIP client carries out any other actions related to the SIP message. Preferably an indicator is put into the header of a SIP message to indicate that it has been associated with computer software code, and SIP clients are arranged to detect the presence of such indicators. An application programming interface is created in order that the computer software code may control the SIP client and/or any processor associated with that SIP client. In one example, computer software code is associated with SIP messages in order that a service for automatically setting up multi-media conferences is provided.

According to an aspect of the present invention there is provided a method of communicating between a first and a second node in a communications network, each of said nodes comprising a SIP client, said method comprising the steps of:—
 associating computer software code with a SIP message;
 sending the SIP message from the first SIP client associated with the first node to the second SIP client associated with the second node; and
 executing the computer software using the second node.

This provides the advantage that the functionality of SIP is greatly increased. It is possible to associate computer software code such as Java applets or a Java Mobile Agent with a SIP message such that the code is executed by a receiving communications network node. For example, the code can be used to control the second node in order to provide services such as a service for automatically setting up a multimedia conference call.

Preferably said computer software code is added to the SIP message. This enables the code to be easily accessed by the second node.

Preferably, said step of associating computer software code with the SIP message comprises adding an address to the SIP message which indicates where the computer software is stored. This provides the advantage that the size of the SIP message is not greatly increased whilst at the same time allowing the second node easy access to the computer software code using the address.

Preferably the method described above further comprises the step of proceeding with any SIP process related to the SIP message. This provides the advantage that any SIP process related to the SIP message is not affected by the presence of the computer software code unless that code is intended to affect that process.

Advantageously, the second SIP client is arranged such that on receipt of a SIP message containing an indicator, the computer software code associated with the SIP message is executed by the second node before that second node carries out any other processes related to the SIP message. This provides the advantage that if the computer software code is designed to affect the SIP process associated with the SIP message, this is achieved.

According to another aspect of the present invention there is provided a communications network node comprising:
 a SIP client;
 an input arranged to receive SIP messages which may be associated with computer software code;

a processor arranged such that in use, when a SIP message is received, any computer software code associated with that SIP message is executed by the processor.

This provides the advantage that SIP messages that have been associated with computer software code in order to extend the functionality of SIP are received and the computer software code executed. This enables the extra functionality provided by the computer software code to be implemented.

According to another aspect of the present invention there is provided a computer program arranged to control a communications network node, said node comprising a SIP client and a processor, said computer program being arranged to control the node such that if a SIP message is received by the SIP client, any computer software code associated with the received SIP message is executed by the processor.

According to another aspect of the present invention there is provided a communications network comprising a plurality of communications network nodes each such node comprising:
  a SIP client;
  an input arranged to receive SIP messages which may be associated with computer software code; and
  a processor arranged such that in use, when a SIP message is received, any computer software code associated with that SIP message is executed by the processor.

This provides the advantage that a communications network capable of implementing the improved SIP protocol is provided.

According to another aspect of the present invention there is provided a method of setting up a conference call between two or more parties, each party comprising a SIP client and a host processor, said method comprising the steps of:
  associating computer software code with a SIP message;
  sending the SIP message to each of the parties;
  executing the computer software code at each of the host processors.

This provides the advantage that a conference call is quickly and easily set up. The set-up process is taken care of by the computer software associated with the SIP messages.

According to another aspect of the present invention there is provided a system for automatically setting up a conference call between two or more parties, each party comprising a SIP client and a host processor, said system comprising:—a processor for associating computer software code with a SIP message and to send that SIP message to each of the parties; and wherein each of said host processors is arranged to execute the computer software code in use, when the SIP message is received. The system provides a means for automatically setting up conference calls such that attendees do not need to take complex actions to set up the call.

According to another aspect of the present invention there is provided a method of upgrading or replacing interconnected SIP clients each SIP client being associated with a host processor said method comprising the steps of:—
  associating computer software code suitable for said upgrade or replacement with a SIP message;
  sending the SIP message to each of the SIP clients; and
  executing the computer software at each of the host processors.

This provides the advantage that a plurality of SIP clients that are connected, for example in a communications network, may be upgraded or replaced quickly and easily. The upgrade or replacement process may be automated and operators are not required to make the upgrade or replacement using CDs or other media carrying the new software to each SIP client individually.

According to another aspect of the present invention there is provided a method of testing members of a group of SIP clients each SIP client being associated with a host processor said method comprising the steps of:—
  associating computer software code suitable for said testing with a SIP message;
  sending the SIP message one of the SIP clients;
  executing the computer software at the host processor associated with that SIP client in order to obtain test results; and
  repeating steps (ii) to (iii) for each of the other SIP clients in the group.

This provides the advantage that a group of SIP clients, for example, in a communications network, may be automatically tested in a quick and efficient manner. For example, if an error is reported on a network and the location or nature of that error is unknown, this method of testing may be used to investigate the situation.

According to another aspect of the present invention there is provided a method of forwarding a call from a first SIP client to a second SIP client, each of said SIP clients being associated with a host processor, said method comprising the steps of:—
  receiving a call at the first SIP client and if that call is not answered then associating computer software code with a SIP message said computer software code being arranged to forward a call;
  sending the SIP message from the first SIP client to a specified second SIP client; and
  executing the computer software using the host processor associated with the second SIP client such that the call is forwarded to the second SIP client.

This provides the advantage that a call is quickly and efficiently forwarded in the event that the call is not answered at a first SIP client. This method can be extended for greater numbers of connected SIP clients, for example, so that if a call to a person in an office is not answered that call will automatically be forwarded to other terminals in the office until the call is answered.

Further benefits and advantages of the invention will become apparent from a consideration of the following detailed description given with reference to the accompanying drawings, which specify and show preferred embodiments of the invention.

DETAILED DESCRIPTION OF THE INVENTION

Embodiments of the present invention are described below by way of example only. These examples represent the best ways of putting the invention into practice that are currently known to the Applicant although they are not the only ways in which this could be achieved.

The term "SIP Client" is used to refer to a computer program that is arranged to control a communications network node such that it is able to send SIP messages such as SIP request messages. The computing platform that the SIP client runs on is referred to as a "host system". The communications network node either comprises the host system or is associated with the host system.

The term "Java virtual machine" is used to refer to a processor which is arranged to execute Java applets or Java byte code.

The term "mobile autonomous software agent" is used to refer to a computer program that is able to halt itself and move itself from a first processor to another processor that is connected to the first processor for example by a communications network. The computer program is referred to as being autonomous because it is able to "decide" where to move and what it will do independently of external requests. An example of a mobile autonomous software agent is a Java mobile agent. Details about Java mobile agents are given in the article, "Under the Hood: The architecture of aglets", by Bill Venners, JavaWorld April 1997 the contents of which are incorporated herein by reference.

By extending the SIP protocol increased functionality is provided. SIP messages are modified to carry computer software code such as Java applets or to carry an address such as an universal resource locator (URL) indicating where computer software code is stored. An application programming interface (API) is also defined which allows the computer software code to interact with a receiving host system: SIP clients are also modified in order that they execute the computer software code associated with the SIP messages before any other actions are taken as a result of receipt of the SIP message.

Figure 1:
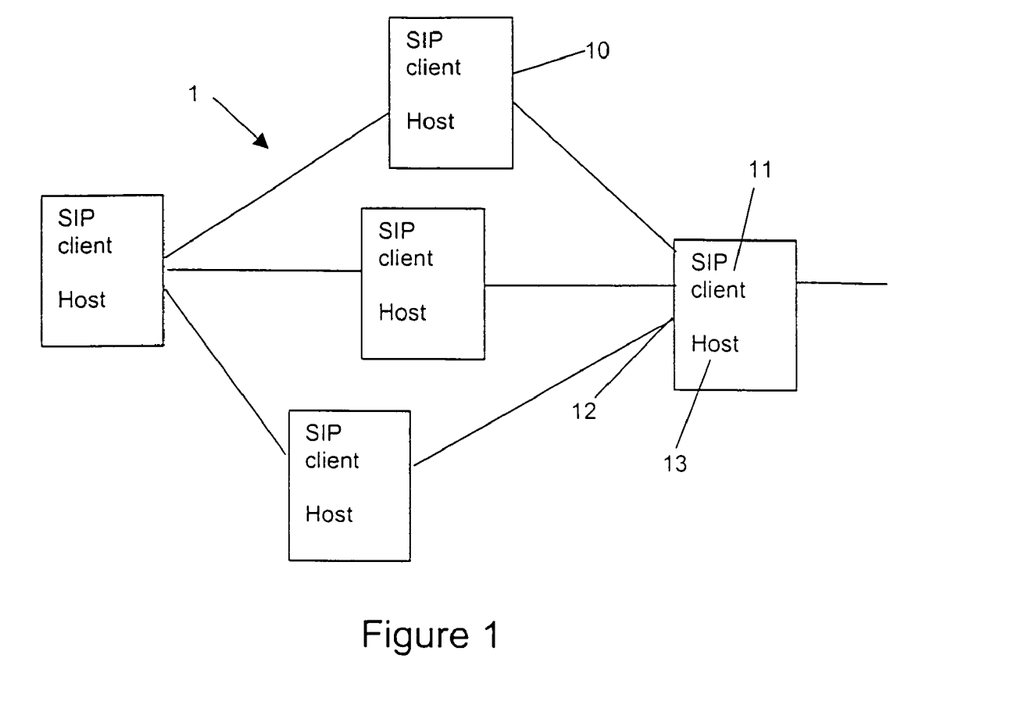
FIG. 1 is a schematic diagram of a communications network which incorporates nodes for implementing an improved SIP protocol.

FIG. 1 shows a communications network 1 comprising a plurality of communications network nodes 10 each such node comprising:
- a SIP client 11;
- an input 12 arranged to receive SIP messages which may be associated with computer software code; and
- a processor 13 arranged such that in use, when a SIP message is received, any computer software code associated with that SIP message is executed by the processor. This processor is provided by the host system and may comprise a Java virtual machine or any other suitable processor. These communications network nodes are referred to as enhanced SIP nodes because they are arranged to allow the enhanced SIP process to work.

Figure 2:
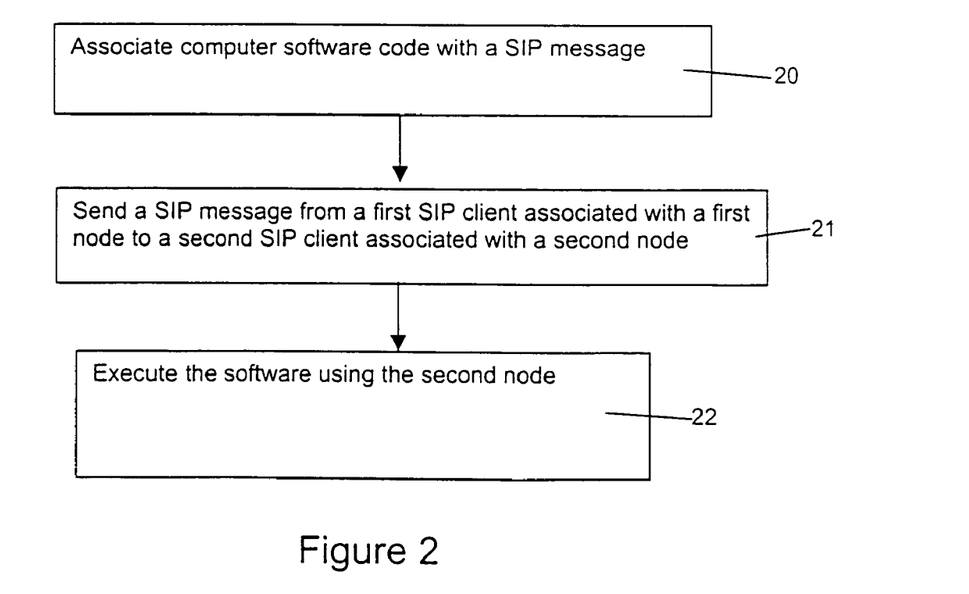
FIG. 2 is a flow diagram of a method of communicating between two SIP clients using an improved SIP protocol.

The communications network of FIG. 1 is used in conjunction with the method illustrated in FIG. 2 in order to implement the enhanced SIP process. FIG. 2 is a flow diagram of a method of communicating between a first and a second node in a communications network, each of said nodes comprising a SIP client, said method comprising the steps of:—
- associating computer software code with a SIP message (box 20 in FIG. 2);
- sending the SIP message from the first SIP client associated with the first node to the second SIP client associated with the second node (box 21 in FIG. 2); and
- executing the computer software using the second node (box 22 in FIG. 2).

Figure 3:
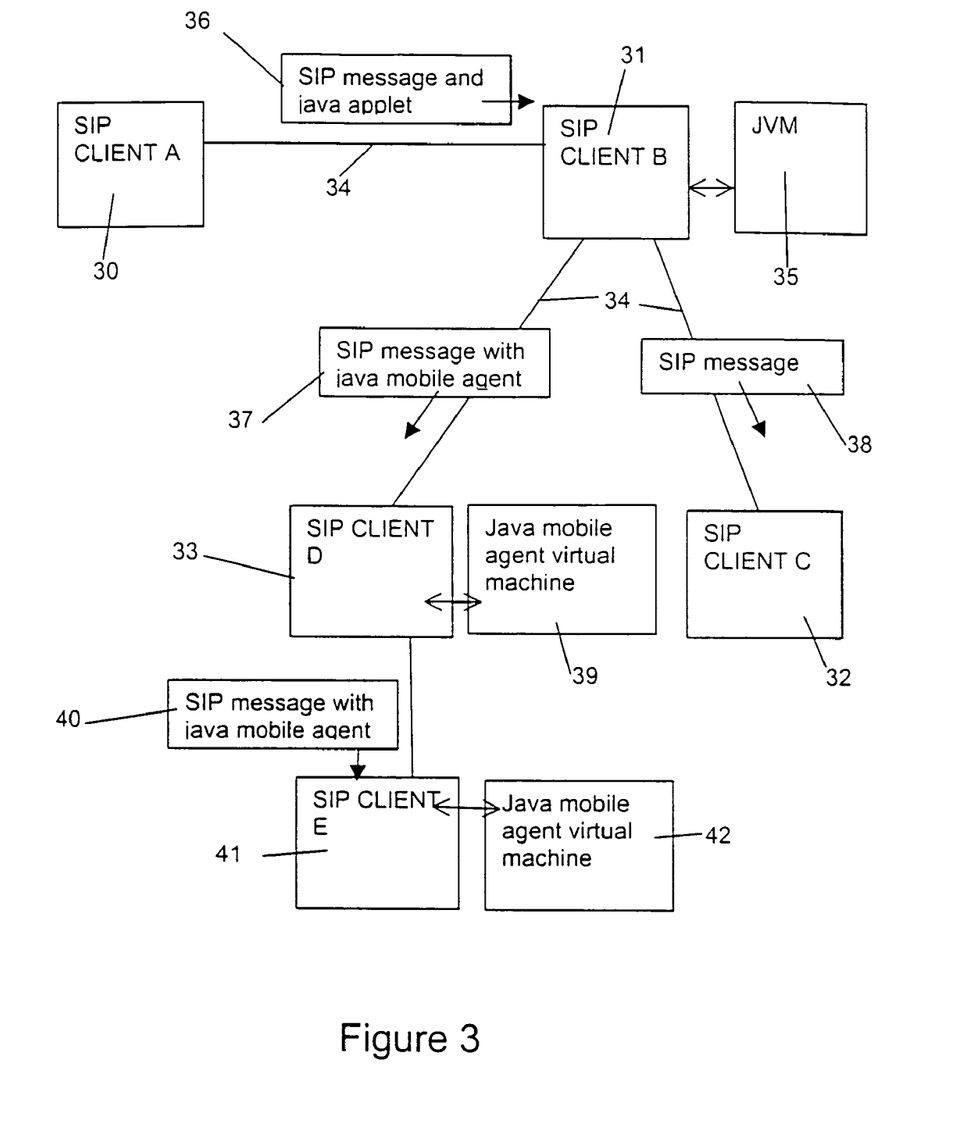
FIG. 3 is a schematic diagram of interaction between a plurality of SIP clients according to the improved SIP protocol.

For example, FIG. 3 illustrates an example of how a plurality of enhanced SIP clients 30, 31, 32, 33, 41 interact. Each SIP client is supported on a communications network node (not shown). SIP client A 30 is connected to SIP client B 31 via a communications link 34 and SIP client B 31 is connected to both SIP client C 32 and SIP client D 33 via communications links 34. SIP client B 31 has a host system 35 which comprises a Java virtual machine. SIP client D 33 is also connected to SIP client E via a communications link. SIP client D and has a host system 39 which comprises a Java mobile agent virtual machine and SIP client E 41 also has a host system 41 42 which comprises a Java mobile agent virtual machine 42.

Using the enhanced SIP protocol, computer software code such as Java applets are associated with a SIP message 36. That is, the computer software code may be added to the SIP message body itself or may be stored separately and an address of the storage location added to the SIP message. It is not essential to use Java applets or Java mobile agents; any other suitable computer software code may be used. The message 36 is sent from SIP client A 30 to SIP client B 31. SIP client B detects the presence of the Java applets (or other computer software code) associated with the SIP message 36 and executes these Java applets using its Java virtual machine 35 (or other type of host processor).

Any suitable method of detecting the presence of computer software code associated with the SIP message 36 may be used. For example, an indicator may be placed in the header of the SIP message 36 and the SIP client 31 arranged to detect that indicator and associate it with the presence of computer software code. An example of such an indicator in a SIP message is described in more detail below.

By executing the Java applets, two new SIP messages 37, 38 are created one of which 37 contains a Java mobile agent and the other which does not. This is just one example of a something that the computer software code associated with the SIP message could do. For example, the computer software code could also be arranged to modify existing SIP messages, delete existing SIP messages, generate SIP messages, receive SIP messages or to control the SIP client and/or the host processor to perform any other suitable function. The computer software code is arranged to interact with the host processor via an API as described below. Security restrictions may be enforced by the SIP client and or host system in order to limit the actions that any software code associated with a SIP message is able to effect. More detail about these security restrictions is given below.

The executed Java applets then cause SIP client B 31 to send one of the created messages 37 to SIP client D 33 and the other 38 to SIP client C 32. The message 37 sent to SIP client D contains a Java mobile agent (or other computer software code or an address of computer software code). If SIP client D has the capability to execute the Java mobile agent contained in message 37 then SIP client D does so. However, if SIP client D does not have this capability, for example, if SIP client D has no Java mobile agent virtual machine, then SIP client D simply follows the standard SIP procedure for unsupported require extensions. This involves returning an error message to SIP client B, indicating that the Java applet in message 37 was not executed.

In the meantime, SIP message 38 which is not associated with any computer software code, is sent to SIP client C 32 and any SIP process associated with that message 38 is carried out following the standard SIP protocol.

In this example, SIP client D does have an associated Java mobile agent virtual machine 39 and so when message 37 arrives, the Java mobile agent in message 37 begins to execute on this processor. At some point in the execution, the Java mobile agent suspends itself and includes itself in SIP message 40 which is sent to SIP client E. This is one example of a process that may occur by incorporating a Java mobile agent into a SIP message.

In the enhanced SIP protocol described herein, standard SIP messages are modified by associating computer software code with them as described above. For example, one or more Java applets or Java mobile agents are stored in a multipart MIME section in the body of a SIP message or a URL indicating where the Java applets or Java mobile agents are stored is added to the SIP message.

In some examples, an indicator is added to the SIP message header, in order to indicate that computer software code is associated with that SIP message. For example, a "Require request-header" is used to indicate that Java enhanced SIP must be supported to process a SIP message that is associated with Java applets or Java byte code. This require request header is the same as the header for a standard SIP message except that the content type field in the entity header is used to indicate that the content type is a Java applet or the URL of a Java applet which must be retrieved. Also, the require field of the request-header is used to specify that Java enhanced SIP must be supported to process the message concerned.

Figure 4:
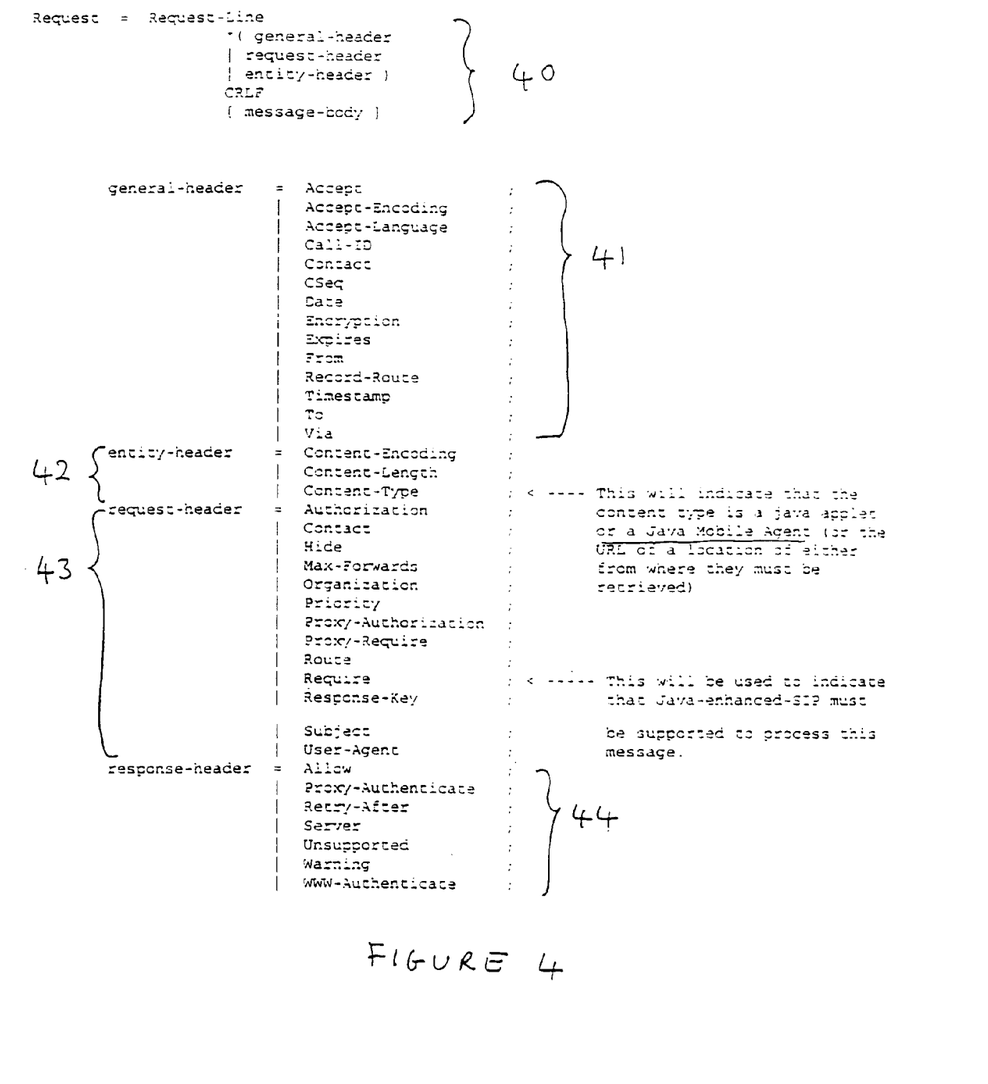
FIG. 4 shows the format of an improved SIP protocol message.

FIG. 4 illustrates the structure of a standard SIP message and shows how this structure is used in the improved SIP protocol described herein. The structure of a standard SIP message is illustrated at 40 in FIG. 4. Thus a standard SIP message comprises a general-header, a request-header, an entity header, a CRLF and a message body. The structure of a general-header is shown at 41 in FIG. 4 and similarly the structures of each of an entity header 42, request header 43 and response header 44 are shown. In order to indicate that the improved SIP protocol described herein is being used markers or tags are included in the SIP message in any suitable location. For example, the content-type field of an entity header may be used to indicate that the content type is a Java applet or the URL of a location of a Java applet. Similarly, the content-type field of an entity header may be used to indicate that the content type is a Java mobile agent or the URL of a location of a Java mobile agent. Also, the require field of a request header may be used to indicate that Java enhanced SIP must be supported to process the message concerned. However, it is not essential to use the content-type field or the require field for this purpose. Any other suitable field(s) may be used.

Figure 5:
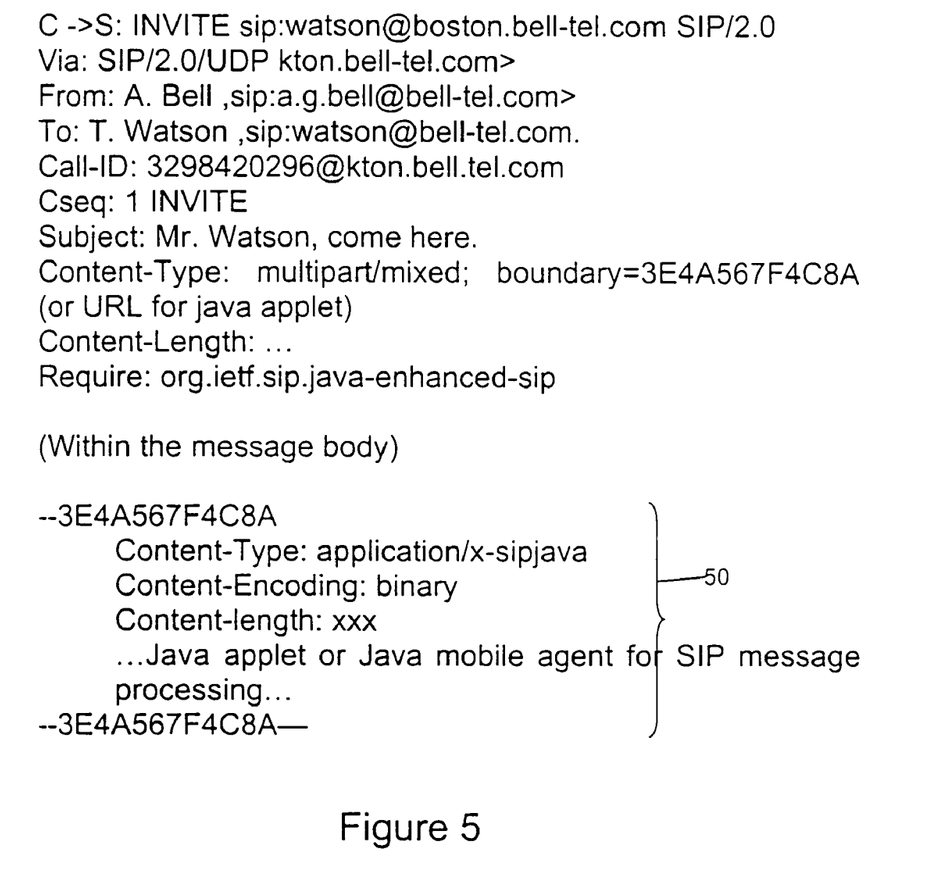
FIG. 5 is an example of an improved SIP protocol INVITE message.

FIG. 5 shows an example of an INVITE message according to the improved SIP protocol described herein. The content type field contains the words "multipart/mixed" which indicates that the INVITE message body is in the form of a MIME multipart message which contains one or more Java applets or Java mobile agents. The require field contains the words "org.ietf.sip.java-enhanced-sip" which indicate that the improved SIP protocol must be used to process this message. Part of the body of the INVITE message containing the Java applet(s) or Java mobile agents is shown 50.

The SIP clients used to implement the improved SIP protocol are the same as standard SIP clients except that they are arranged to do the following things:

Detect improved SIP messages which are associated with computer software code. For example, this may be done by arranging the SIP client to recognise the presence of the words "org.ieff.sip.java-enhanced-sip" or "org.ietf.sip.java-mobile-agent-enhanced-sip" in the SIP message header.

If an improved SIP message is received and detected, the software code associated with that SIP message is accessed by the SIP client and executed on the SIP client's host processor. Preferably, this execution is carried out immediately, before processing the SIP message any further. For example, if a content type field in a SIP header indicates that a URL for a Java applet is present then the SIP client must immediately get the applet from the URL and execute the applet on a Java virtual machine associated with the SIP client. If the SIP client does not execute the software code then it is preferably arranged to respond by returning status code 420 (bad extension) and by listing org.ietf.sip.java-enhanced-sip in an unsupported header. The SIP client may not execute the software code if it is unable to do so, for example, if no Java virtual machine is available, or if the SIP client decides not to do this, for example, for security reasons.

Match incoming SIP messages to patterns and in the event of a match "wake up" any waiting computer software code. This is described in more detail below.

The SIP client's host processor is modified as compared to a standard SIP client's host processor in that it must comprise a processor of a specific type. For example, a Java virtual machine in the case that Java applets are associated with the improved SIP messages. In the case that Java mobile agents are used, a Java mobile agent virtual machine is required. Also, the SIP client's host processor has access to or comprises an API to allow the computer software code associated with the improved SIP messages to interact with the SIP client. For example, in the case that Java applets are used, the SIP client's host has access to a set of Java classes or applets that are defined in a Java enhanced SIP API. This API allows access into the SIP client to allow SIP messages to be built and sent subject to security restrictions. Using the API received Java applets or Java mobile agents are able to generate and receive SIP messages using the receiving SIP client.

Passing of Control Between the Computer Software Code Associated with Improved SIP Messages and the SIP Client Concerned In the case that standard SIP messages are used, these are processed by SIP clients in the standard way and control remains with the SIP clients. However, in the improved SIP case described herein, any computer software code associated with a SIP message takes precedence over other standard SIP processes associated with the SIP message or with any other SIP messages received by a SIP client during processing of the computer software code.

For example, the computer software code associated with a SIP message can be arranged to initiate a SIP session and to wait for a SIP response before proceeding. During this waiting period, control remains with the computer software code. The computer software code is able to specify that it will go to sleep and wait for the next SIP message which matches a particular pattern. In that case, the SIP client does no other actions during the sleep period. Alternatively, the computer software code can deal with any other incoming SIP messages itself during the sleep period. Thus control does not pass back to the SIP client until the computer software code wants it to even if SIP messages from other sessions are arriving.

Application Programming Interface (API)

As described above an API is specified in order that the computer software code associated with improved SIP messages is able to affect the SIP client. For example, this API allows a received Java applet or Java mobile agent access to the SIP messaging functions on the SIP client.

Examples of methods that the API supports comprise

SendSIPMessage—sends a SIP message and establishes a context for the Session if one does not already exist. The invoker (which is the piece of software code which called this function) can indicate if it wants the message to be part of an existing Session. For example, the invoker could be a Java applet or Java mobile agent.

ReceiveSIPMessage—retrieves a SIP message from the Client's input buffer on a first in first out (FIFO) basis.

ReceivedMessageSummary—returns a summary of any received messages in the client's input buffer along with a count of messages received. If the client does not support buffering of input messages this is indicated.

QueryCapabilities—returns the capabilities of the Client. These include the ability to buffer incoming messages and the buffer size.

Querystatus—returns the status of any sessions the client is currently involved in.

MatchMessageAndWake—checks incoming messages against a particular pattern and if they match wakes up the indicated applet or Java mobile agent and passes the messages directly to the indicated applet.

ProcessMessage—sends a message to the Client and passes control to the client for the message to be processed as in standard SIP. For example, this can be used after an applet or Java mobile agent has looked at the message or altered it in some way and then wants to pass the message back to the client to be processed as in standard SIP.

ProcessMessageAndReturn—as for ProcessMessage except that control is passed back to the invoker after the message has been processed.

ProcessFromBufferAndReturn—processes the next message on the INPUT buffer as in standard SIP within the client and then returns control to the invoking applet or Java mobile agent.

Changes to SIP Proxy and SIP Server Behaviour

Following standard SIP as defined in "Request for comments (RFC) 2543 SIP: Session Initiation Protocol", SIP proxy and redirect servers must ignore features that are not understood. That is, if a SIP proxy or redirect server is not arranged to understand the improved SIP messages described herein then it must ignore features of those messages that are not common to standard SIP. A SIP proxy server is a communications network node which communicates using the SIP protocol on behalf of other parties. A SIP redirect server is a communications network node which receives SIP messages and directs these to another communications network node. If a particular extension to the standard SIP protocol requires that intermediate devices support it, the fact that the extension is being used must be tagged in the proxy-require field as well (see section 6.28 of the SIP RFC mentioned above). Thus for the improved SIP described herein, an indicator is placed in the proxy-require field to specify that the improved SIP is being used.

Security

Preferably, security mechanisms are incorporated in to the improved SIP protocol although this is not essential. For example, a host system which supports a SIP client preferably comprises security mechanisms for controlling the activity of software code such as Java applets or Java mobile agents received as a result of the improved SIP messages. These security mechanisms may be configured by a user or operator, for example, to always allow or prevent certain operations from being carried out by Java applets or Java mobile agents received from improved SIP messages. The user may datafill a matrix of SIP operations against security mechanism actions. It is also possible for the security mechanism to prompt the user to ask for permission to proceed with certain actions. The security mechanisms are put into effect by a security manager which takes the form of a computer software application located at each SIP client. Preferably, all the methods specified in the API are arranged to check with the security manager at the SIP client concerned before proceeding with the rest of that method. In the case that Java byte code, Java applets or Java mobile agents are used, then the security mechanisms are preferably designed to conform to the standard Java security practices.

An example of an algorithm for a security mechanism is:
Index the matrix for user defined security checks against that operation
Extract the method corresponding to the security action datafilled by the user
Execute that security mechanism method
If the result of the security mechanism method is "pass" then continue and call the SIP API method
Else display a security disallowed message and return without calling the SIP API method.

Actions that a user may datafill for a given SIP operation include:
Allow always
Disallow always
Allow conditional
Disallow conditional
Prompt y/n
Allow and display warning or info An example of use of the improved SIP protocol to create a service for automatically setting up multimedia conferences is now described.

Conferencing System

Using the improved SIP protocol a conferencing service is created whereby a single chairperson is able to set up the conference by sending out SIP INVITE messages. The method is suitable for multimedia conferences. The INVITE messages are associated with computer software code which executes on the host machines of invited attendees to set up the conference call. This greatly simplifies the process of setting up a conference call such as a multimedia conference call.

For example, the computer software code associated with the improved SIP INVITE messages can be arranged to set up connections from each attendee's machine to several video sources and to an electronic whiteboard to be shared for the meeting. The computer software code can also be arranged to start up a web browser to a page relevant to the meeting on each attendee's machine. As well as this the computer software code is able to set up all the audio paths between all the parties with everyone but the chairman initially on mute. As well as this the computer software code is able to take into account different capabilities of individual attendee's host machines. For example, a particular attendee such as a mobile caller may only have audio capabilities whilst a full multimedia caller may have audio, video, data and web capabilities. In order that these capabilities are taken into account, attendee's indicate what their capabilities are in SIP messages as required.

The multimedia conferencing service is particularly advantageous from the attendee's point of view. All the attendee has to do is to accept the incoming call and SIP INVITE message and everything will be set up for them automatically. Alternatively, the attendee may call a conference number and receive a SIP message in reply which is associated with the required computer software code. The conference number may be the number of a particular user client or of a central conference service provider.

Preferably security mechanisms are used in the multimedia conferencing service as described above.

Figure 6:
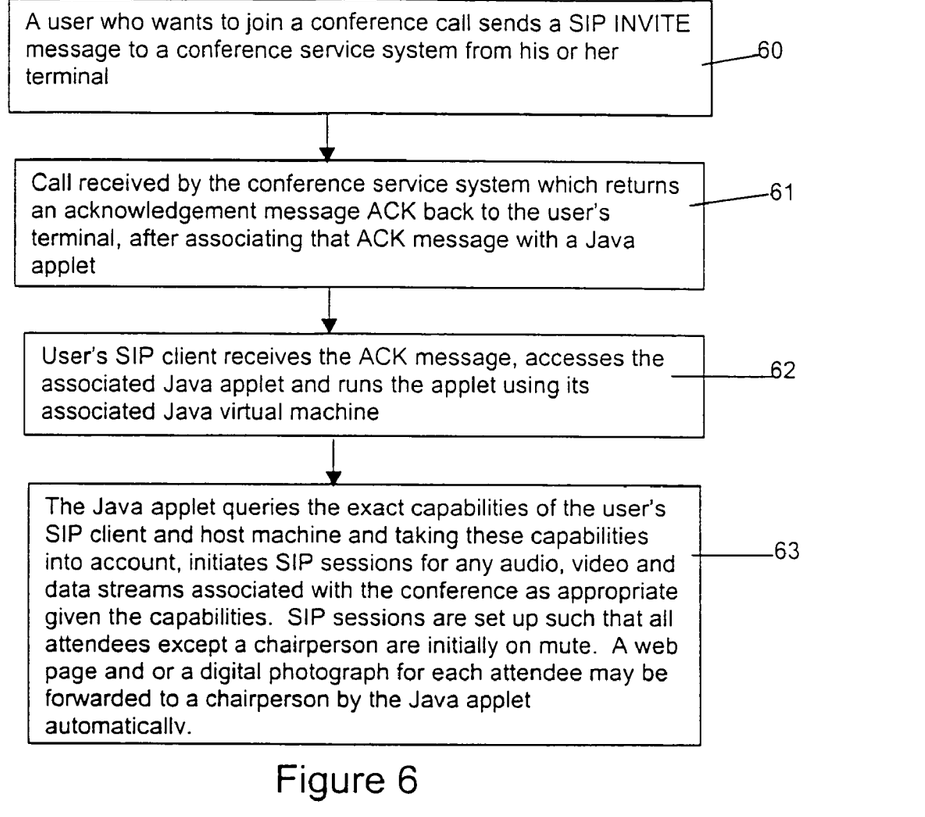
FIG. 6 is a flow diagram of a method of setting up a conference call using a conference call service system.

FIG. 6 is a flow diagram of a method where a central conference service system is used and where Java applets are associated with the improved SIP messages. The first stage involves a user who wants to join a conference call sending a SIP INVITE message to the conference service system from his or her terminal (box 60 FIG. 6). This call is received by the conference service system which then returns an acknowledgement message ACK back to the user's terminal (box 61 FIG. 6). This ACK message is associated with one or more Java applets which contain methods from the API discussed above. The user's SIP client receives the ACK message, accesses the associated Java applet(s) and runs these using its associated Java virtual machine (box 62 FIG. 6).

The Java applet(s) query the exact capabilities of the user's SIP client and host machine and taking these capabilities into account, initiate SIP sessions for any audio, video and data streams associated with the conference as appropriate given the capabilities (box 63 of FIG. 6). Depending on how the user has his or her security mechanisms set he or she may be prompted before the sessions are set up for the various media streams. When the Java applet(s) initiate the SIP sessions (box 63 of FIG. 6) they may also be arranged to set up these SIP sessions such that all the attendees except for a chairperson are on mute. This is particularly advantageous, because the chairperson is then easily able to announce the beginning of the meeting and to chair the meeting in an organised fashion.

The Java applets(s) may also be arranged to forward details of a web page from each attendee to a chairperson or to the conference service system. For example, a web page giving biographical details of each attendee may be forwarded to a chairperson who then makes these available to each other attendee. In a similar manner, digital photographs of each attendee may be forwarded to the chairperson by the Java applets. It is also possible for the Java applets to request a joining message from each attendee which is then forwarded to a chairperson automatically by the Java applets. This joining message may contain security requirements specific to each attendee.

Depending on the number of parties to the conference, a conferencing bridge facility may be used as is known in the art. Alternatively, a software based technique is used to connect the parties to the conference.

An example of an algorithm that is encoded in the Java applet(s) of the method described immediately above is:

Read the message that the Java applet was associated with to obtain the addresses for the various streams in the call Query the capabilities of the SIP client Query the capabilities of the host system Based on the above information for each media type and application available on the conference call:

If this application and media type is supported on the SIP client, initiate a SIP session between the SIP client and the relevant SIP client for that media stream.

Initiate a SIP message to the central conference service system detailing the number and types of streams set up.

Figure 7:
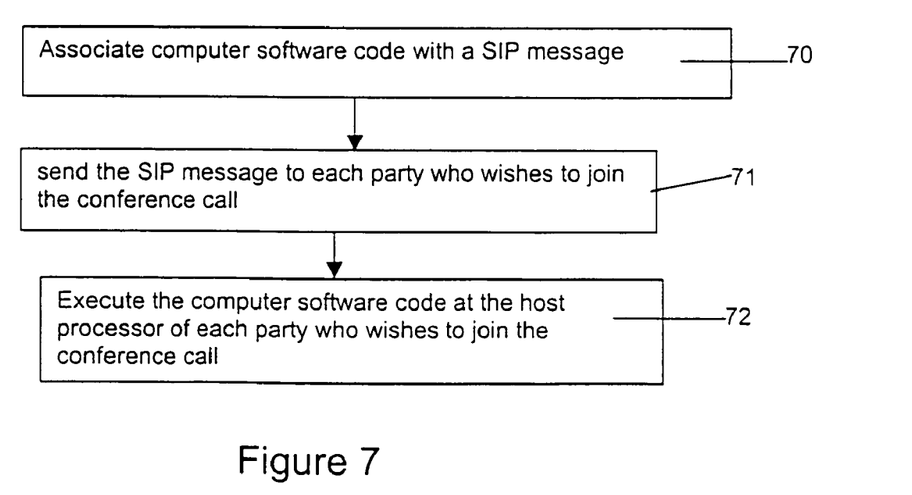
FIG. 7 is a flow diagram of a method of setting up a conference call.

FIG. 7 is a flow diagram of a method of setting up a conference call between two or more parties, each party comprising a SIP client and a host processor, said method comprising the steps of:
  associating computer software code with a SIP message (box 70 of FIG. 7);
  sending the SIP message to each of the parties (box 71 of FIG. 7);
  executing the computer software code at each of the host processors (box 72 of FIG. 7).

FIG. 1 also shows a system for automatically setting up a conference call between two or more parties 10, each party comprising a SIP client 11 and a host processor 13, said system comprising:—a processor 13 for associating computer software code with a SIP message and to send that SIP message to each of the parties 10; and wherein each of said host processors 13 is arranged to execute the computer software code in use, when the SIP message is received.

In the case that a conferencing system is used, this system sends the SIP messages to each party as a result of request calls from those parties to the system. In the case that a chairperson sets up the call, then the chairperson sends the SIP messages to each party.

Hunt Group System

An example of the use of improved SIP with Java mobile agents is now described. In this example, a service is provided whereby an automated system calls several telephones within a defined group (such as a team in an office) until one of those telephones is answered. For example, the nodes of the communications network in FIG. 1 may each provide a telephone implemented by software in the SIP clients 11. Each telephone within the group 1 comprises a SIP client 11 and a host processor 13 as illustrated in FIG. 1 and the telephones are connected to one another via a communications network 1 as shown in FIG. 1. The host processors each comprise a Java mobile agent virtual machine.

A user, which may be an automated service or a human using a terminal connected to the communications network 1, telephones one of the telephones 10 within the defined group. If the called telephone is not answered after a specified number of rings or an elapsed time, then software at the SIP client 11 of the called telephone creates a Java mobile agent, associates this with a SIP message, and sends the SIP message to a predefined second SIP client. This second SIP client is one of the telephones within the defined group 1.

The second SIP client receives the SIP message which is associated with the Java mobile agent. The Java mobile agent then executes itself on the Java mobile agent virtual machine associated with the second SIP client. The Java mobile agent is arranged to apply ringing to the second telephone and queries the second telephone's identification details and sends these back to the original caller. If the caller is using a host processor that has a display system associated with it, then information about the call and the fact that it has been forwarded to the second telephone in the defined group is sent by the Java mobile agent to this display.

If the second SIP client does not answer after a specified number of rings or time then the second SIP client repeats the method that the first SIP client carried out as described above. However, the second SIP client incorporates information about the fact that the call has been forwarded again.

After the method has been repeated a pre-determined number of times and if the call is not answered, then the call is sent back to the first SIP client that was called. A display of the route taken and the fact that the call was not answered is made at the first SIP client if a display is available.

If the call is answered, information about the route taken and the identity of the answering SIP client is sent back to the caller which may be an automated service.

Figure 10:
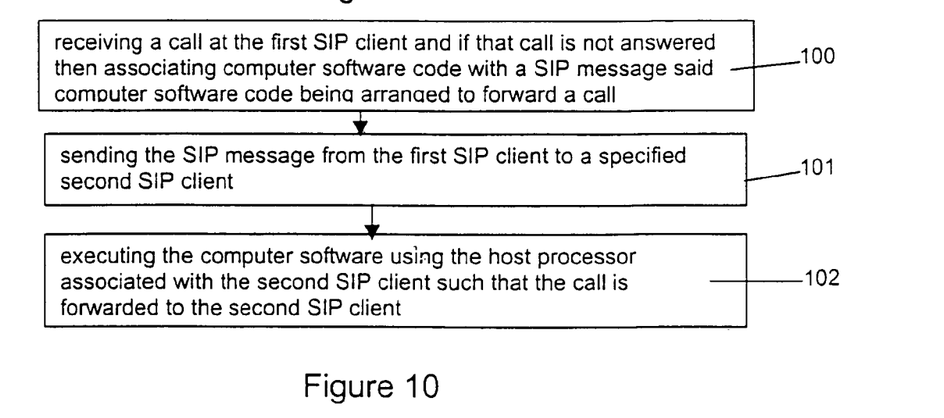
FIG. 10 shows a method of forwarding a call from a first SIP client to a second SIP client.

FIG. 10 shows a method of forwarding a call from a first SIP client to a second SIP client, each of said SIP clients being associated with a host processor, said method comprising the steps of:—
- receiving a call at the first SIP client and if that call is not answered then associating computer software code with a SIP message said computer software code being arranged to forward a call (box 100 FIG. 10);
- sending the SIP message from the first SIP client to a specified second SIP client (box 101 FIG. 10); and
- executing the computer software using the host processor associated with the second SIP client such that the call is forwarded to the second SIP client (box 102 FIG. 10).

Client Test System

Another example of the use of Java mobile agents with improved SIP involves a test system for a pre-defined group of SIP clients. For example, the network of SIP clients shown in FIG. 1. The SIP clients 11 are connected to one another to form a communications network 1 as illustrated in FIG. 1. Each SIP client 11 is associated with a host processor 13 which comprises a Java mobile agent virtual machine.

A test system (for example, software located at one of the nodes 10 in the communications network 1), which may be an automated software service, creates a Java mobile agent, associates this with a SIP message, and sends that SIP message to one of the SIP clients 11 in the group. The Java mobile agent executes on the receiving SIP client and sets up one or more test sessions. The results of these test sessions are stored by the Java mobile agent in its private data, together with any other required information. The Java mobile agent then associates itself with another SIP message and arranges that this SIP message be sent to another SIP client in the group. When the SIP message reaches another SIP client the process of obtaining information is repeated so that more information is added to the Java mobile agent's private data. Another SIP message is used to send the Java mobile agent on to another SIP client and so on, until all the SIP clients in the group have been visited. Once all the SIP clients in the group have been visited by the Java mobile agent, this agent associates itself with a SIP message in order to be sent back to the originating SIP client. The Java mobile agent may also be arranged to initiate other actions to fix any faults that it finds as it finds them.

Figure 9:
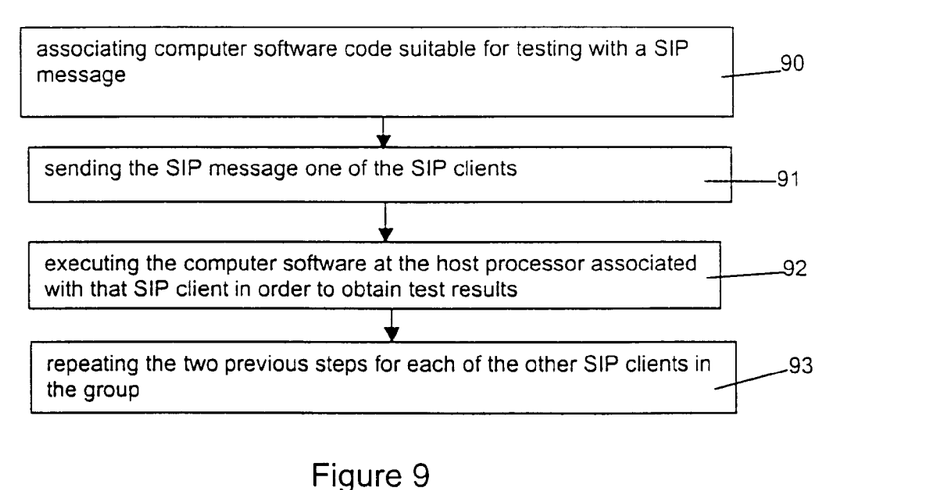
FIG. 9 shows a method of testing members of a group of SIP clients.

FIG. 9 shows a method of testing members of a group of SIP clients each SIP client being associated with a host processor said method comprising the steps of:—
- associating computer software code suitable for said testing with a SIP message (box 90 FIG. 9);
- sending the SIP message one of the SIP clients (box 91 FIG. 9);
- executing the computer software at the host processor associated with that SIP client in order to obtain test results (box 92 FIG. 9); and
- repeating steps (ii) to (iii) for each of the other SIP clients in the group (box 93 FIG. 9).

Upgrade or Replacement of SIP Clients

Consider a situation in which it is required to upgrade or replace SIP clients which support the improved version of SIP described herein. This may be carried out automatically as follows:

The software for the upgrade or new SIP client is associated with a SIP message, for example, by building the software into a Java applet and adding this applet to a SIP message. This SIP message is then sent to all the SIP clients which are to be upgraded or replaced. On receipt of the SIP message at a SIP client, the existing SIP client runs the software code in order to effect the upgrade or replacement. The extent to which the upgrade or replacement is effected depends on the security specifications and the type of SIP client. By using the improved SIP protocol in this way, upgrades or replacement of a plurality of SIP clients is achieved quickly and easily.

Figure 8:
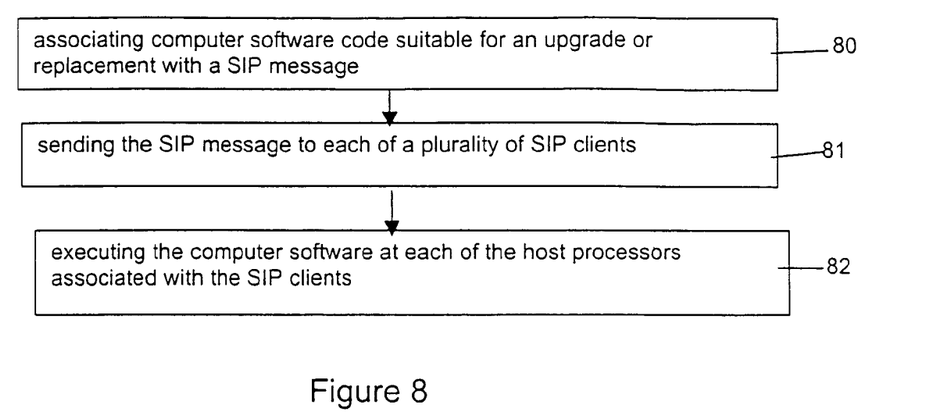
FIG. 8 shows a method of upgrading or replacing interconnected SIP clients.

FIG. 8 shows a method of upgrading or replacing interconnected SIP clients each SIP client being associated with a host processor said method comprising the steps of:—
- associating computer software code suitable for said upgrade or replacement with a SIP message (box 80 FIG. 8);
- sending the SIP message to each of the SIP clients (box 81 FIG. 8); and
- executing the computer software at each of the host processors (box 82 FIG. 8).

A range of applications are within the scope of the invention. These include situations in which it is required to communicate between entities using an improved SIP protocol. For example to enable multimedia conferences to be set up automatically with minimum input from attendees, to carry out an automated test of several nodes in a communications network, or to provide a service whereby if a call is not answered, the call is forwarded automatically to other members of a specified group. Another example concerns third party call control whereby a third party sets up a communication session on behalf of two other parties. The third party may be an automated service such as a web page. For example, a software service may be arranged to monitor stock prices and be arranged such that when a threshold price is reached a communication session between a subscriber and his or her stockbroker service is set up. In such an example, Java applets or other software code associated with improved SIP messages may be used to prepare forms or other documents to request sale or purchase of stocks.

The invention claimed is:

1. A method of transferring computer software code between a first and a second node in a communications network, each of said nodes comprising a SIP client, said method comprising the steps of:—
   (i) storing computer software code in a SIP message;
   (ii) sending the SIP message and computer software code from the first SIP client associated with the first node to the second SIP client associated with the second node; and
   (iii) executing the computer software code using the second node.

2. A method as claimed in claim 1 wherein said computer software code is added to the SIP message.

3. A method as claimed in claim 1 wherein said computer software code comprises Java byte code.

4. A method as claimed in claim 1 wherein said computer software code comprises one or more Java applets.

5. A method as claimed in claim 1 wherein said computer software code comprises one or more mobile automated software agents.

6. A method as claimed in claim 5 wherein said mobile automated software agents are Java mobile agents.

7. A method as claimed in claim 1 wherein said second node comprises a Java virtual machine.

8. A method as claimed in claim 2 wherein the computer software code is added to the body of the SIP message.

9. A method as claimed in claim 1 which further comprises adding an indicator to a header of the SIP message in order to indicate the presence of the computer software code and arranging the second SIP client to recognise the indicator.

10. A method as claimed in claim 1 which further comprises the step of proceeding with any SIP process related to the SIP message.

11. A method as claimed in claim 9 wherein said second SIP client is arranged such that on receipt of a SIP message containing such an indicator, the computer software code stored in the SIP message is executed by the second node before that second node carries out any other processes related to the SIP message.

12. A method as claimed in claim 1 wherein said computer software is arranged to interact with the second SIP client via a specified application programming interface.

13. A method as claimed in claim 1 wherein said computer software is arranged to interact with a processor associated with the second SIP client via a specified application programming interface.

14. A method as claimed in claim 1 wherein said execution of said computer software code causes the second node to set up a multimedia conference call.

15. A method as claimed in claim 1 wherein said execution of said computer software code causes the second node to upgrade said SIP client.

16. A method as claimed in claim 1 wherein said execution of said computer software code causes the second node to carry out a self-test function and to pass the results to another node.

17. A method as claimed in claim 1 wherein a call is made to the first node, the first node is unable to accept the call and the first node sends the said SIP message and computer software code responsive to being unable to accept the call, said execution of said computer software code causes said second node to accept a forwarded call from the first node and to pass the identity of the second node back to a call originator.

18. A communications network node comprising:
   (i) a SIP client;
   (ii) an input arranged to receive SIP messages;
   (iii) a processor arranged to extract and execute computer software code from a received SIP message.

19. A communications network node as claimed in claim 18 wherein said processor comprises a Java virtual machine.

20. A communications network node as claimed in claim 18 which further comprises an application programming interface arranged to allow the computer software code to interact with the SIP client.

21. A communications network node as claimed in claim 18 wherein said processor further comprises a detector arranged to detect an indicator in a received SIP message which indicates that computer software code is associated with that SIP message.

22. A computer program stored in a computer readable medium, the computer program arranged to control a communications network node, said node comprising a SIP client and a processor, said computer program being arranged to control the node when executed on the processor such that when a SIP message is received by the SIP client, which contains computer software code, the software code is executed by the processor.

23. A communications network comprising a plurality of communications network nodes each such node comprising:
   (i) a SIP client;
   (ii) an input arranged to receive SIP messages containing computer software code; and
   (iii) a processor arranged such that in use, when a SIP message is received, any computer software code contained in that SIP message is executed by the processor.

24. A method of setting up a conference call between two or more parties, each party comprising a SIP client and a host processor, said method comprising the steps of:
   a) storing computer software code in a SIP message;
   b) sending the SIP message to each of the parties;
   c) executing the computer software code at each of the host processors.

25. A method as claimed in claim 24 wherein the computer software code is arranged to take into account capabilities of each host processor.

26. A method as claimed in claim 24 wherein said conference call is a multimedia conference call.

27. A system for automatically setting up a conference call between two or more parties, each party comprising a SIP client and a host processor, said system comprising:—a processor for storing computer software code in a SIP message and to send that SIP message to each of the parties; and wherein each of said host processors is arranged to execute the computer software code in use, when the SIP message is received.

28. A method of upgrading or replacing interconnected SIP clients each SIP client being associated with a host processor said method comprising the steps of:—
   i) storing computer software code suitable for said upgrade or replacement in a SIP message;
   ii) sending the SIP message to each of the SIP clients; and
   iii) executing the computer software at each of the host processors.

29. A method of testing members of a group of SIP clients each SIP client being associated with a host processor said method comprising the steps of:—
   (i) storing computer software code suitable for said testing in a SIP message;
   (ii) sending the SIP message one of the SIP clients;
   (i) executing the computer software at the host processor associated with that SIP client in order to obtain test results; and
   (ii) repeating steps (ii) to (iii) for each of the other SIP clients in the group.

30. A method of forwarding a call from a first SIP client to a second SIP client, each of said SIP clients being associated with a host processor, said method comprising the steps of:—
   (ii) receiving a call at the first SIP client and if that call is not answered then storing computer software code in a SIP message, said computer software code being arranged to forward a call;
   (iii) sending the SIP message from the first SIP client to a specified second SIP client; and
   (iv) executing the computer software using the host processor associated with the second SIP client such that the call is forwarded to the second SIP client.

31. A method as claimed in claim 1 wherein said execution of said computer software code causes the second node to replace said SIP client.

* * * * *